United States Patent
Koch et al.

(10) Patent No.: US 10,067,235 B2
(45) Date of Patent: Sep. 4, 2018

(54) WIND EVENT WARNING SYSTEM

(71) Applicant: The United States of America, as represented by the Administrator of the National Aeronautics and Space Administration, Washington, DC (US)

(72) Inventors: Grady J. Koch, Yorktown, VA (US); Bruce W. Barnes, Yorktown, VA (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 313 days.

(21) Appl. No.: 15/069,145

(22) Filed: Mar. 14, 2016

(65) Prior Publication Data

US 2017/0010358 A1    Jan. 12, 2017

Related U.S. Application Data

(60) Provisional application No. 62/189,238, filed on Jul. 7, 2015.

(51) Int. Cl.
| | |
|---|---|
| *G01C 3/08* | (2006.01) |
| *G01S 17/95* | (2006.01) |
| *G01S 17/58* | (2006.01) |
| *G01P 5/26* | (2006.01) |
| *G01S 17/42* | (2006.01) |

(52) U.S. Cl.
CPC ............. *G01S 17/95* (2013.01); *G01P 5/26* (2013.01); *G01S 17/42* (2013.01); *G01S 17/58* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,937,571 | A * | 6/1990 | Bonafe | G05D 1/0615 244/181 |
| 5,311,183 | A * | 5/1994 | Mathews | G01S 13/953 342/26 B |
| 6,147,747 | A | 11/2000 | Kavaya et al. | |
| 9,007,569 | B2 | 4/2015 | Amzajerdian et al. | |
| 9,007,570 | B1 | 4/2015 | Beyon et al. | |

(Continued)

OTHER PUBLICATIONS

Beyon, Jeffrey Y. et al., "Offshore Wind Measurements Using Doppler Aerosol Wind Lidar (DAWN) at NASA Langley Research Center," Conference Paper, May 6, 2014, 7 pages.
Koch, Grady J. et al., Side-scan Doppler Lidar for Offshore Wind Energy Applications. Journal of Applied Remote Sensing, Sep. 12, 2012. pp. 063562-1-063562-11, vol. 6.
Gentry, Bruce M. et al., "Wind Measurements with 355-nm Molecular Doppler Lidar," Optics Letters, Sep. 1, 2000, pp. 1231-1233, vol. 25. No. 17.
Abreu, Vincent J. et al., "Observations of Winds With an Incoherent Lidar Detector," Applied Optics, Aug. 1, 1992, pp. 4509-4514 vol. 31, No. 22.

(Continued)

*Primary Examiner* — Samantha K Abraham
(74) *Attorney, Agent, or Firm* — Jonathan B. Soike; Andrea Z. Warmbier; Mark P. Dvorscak

(57) ABSTRACT

A method of detecting a wind event utilizing Doppler lidar includes causing a Doppler lidar unit to operate in a course scan mode in which a lidar beam is scanned along several directions. Line-of-sight wind speed measurements are generated at each direction and a derivative with respect to distance of the line-of-sight wind speed measurements is calculated at each of the directions. A predicted angular position of a wind event is determined, and the lidar unit may then operate in a fine scan mode in which only a limited sector is scanned. The potential wind event is then quantified utilizing data obtained using the fine scan mode.

19 Claims, 2 Drawing Sheets

(56) References Cited

U.S. PATENT DOCUMENTS

| | | | | |
|---|---|---|---|---|
| 2009/0314900 | A1* | 12/2009 | Puig | G05D 1/0623 |
| | | | | 244/76 C |
| 2010/0182809 | A1* | 7/2010 | Cullinane | H02P 9/02 |
| | | | | 363/34 |
| 2011/0149067 | A1* | 6/2011 | Lewis | G01D 3/08 |
| | | | | 348/135 |
| 2011/0295569 | A1* | 12/2011 | Hamke | G01P 5/00 |
| | | | | 703/2 |
| 2014/0003936 | A1* | 1/2014 | Agarwal | F03D 7/02 |
| | | | | 416/1 |
| 2014/0241878 | A1* | 8/2014 | Herrig | F03D 7/0224 |
| | | | | 416/1 |
| 2014/0278389 | A1* | 9/2014 | Zurek | G10L 15/20 |
| | | | | 704/231 |
| 2015/0056072 | A1* | 2/2015 | Perley | F03D 7/0288 |
| | | | | 416/1 |

OTHER PUBLICATIONS

Prasad, Narasimha S. et al., "An All-fiber, Modular, Compact Wind Lidar for Wind Sensing and Wake Vortex Applicatons," Proc. SPIE 9465, Laser Radar Technology and Applications XX; and Atmosphere. Propagation XII, Jun. 15, 2015, 11 pages.

Grund, Christian J. et al. "High-Resolution Doppler Lidar for Boundary Layer and Cloud Research," Journal of Atmospheric and Oceanic Technology, Mar. 2001, pp. 376-393, vol. 18.

Koch, Grady J. et al., "High-energy 2um Doppler Lidar for Wind Measurements," Optical Engineering, Nov. 2007, pp. 116201-1-116201-14, vol. 46, No. 11.

* cited by examiner

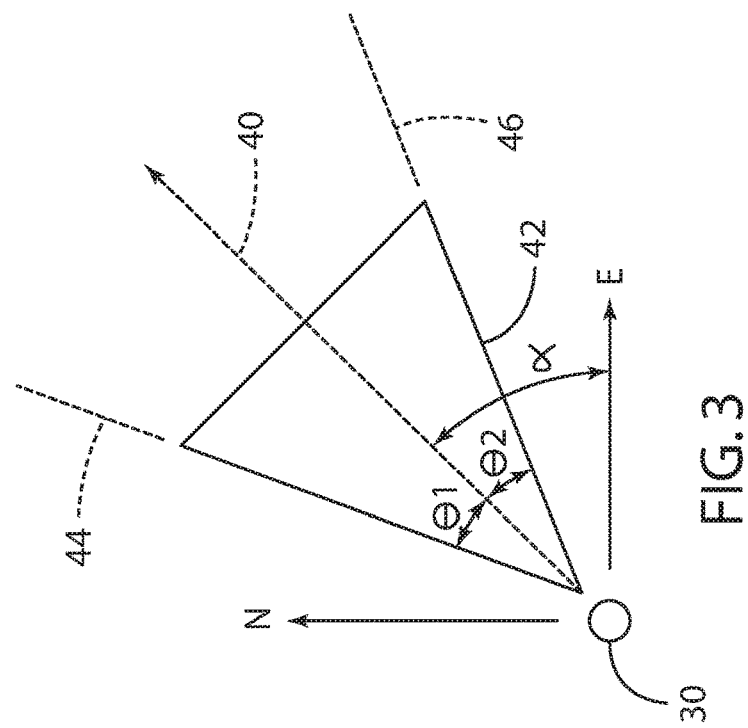
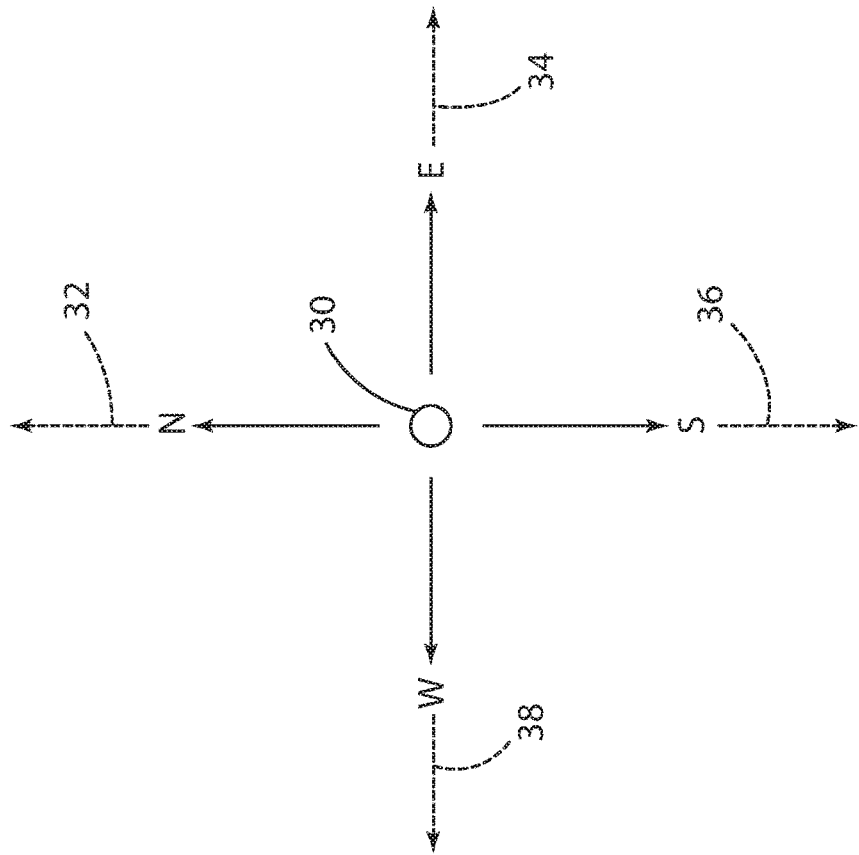

WIND EVENT WARNING SYSTEM

CROSS-REFERENCE TO RELATED PATENT APPLICATION(S)

This patent application claims the benefit of and priority to U.S. Provisional Patent Application No. 62/189,238, filed on Jul. 7, 2015, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

FIELD OF THE INVENTION

This invention relates to a wind event warning system and method, and in particular to a lidar system/method that may be utilized to detect wind events such as wind gusts and the like and provide a warning if a wind event is detected.

BACKGROUND OF THE INVENTION

Various weather phenomena can present strong winds capable of damaging property and/or causing injury. Some structures and activities such as wind energy production and aircraft operations can be especially vulnerable to severe wind events. For example, wind turbines may be destroyed by unexpected wind gusts, in which there is a rapid change in wind speed and/or direction. Destruction of wind turbines may constitute a significant financial loss. Severe wind events can also create hazards for aircraft on take-off or landing at airports.

Wind turbines may have features to disable the rotation of the turbine by feathering the blades of the turbine. If a strong wind is known to be approaching, such as from a hurricane, the turbine is protected by feathering the blades to prevent mechanical stress on the turbine. However, severe wind events may not be predicted, and may develop rapidly, so a need to protect the turbine may not be anticipated.

BRIEF SUMMARY OF THE INVENTION

One aspect of the present invention is a method of detecting a wind event utilizing Doppler lidar. The method includes causing a Doppler lidar unit to operate in a course scan mode in which a lidar beam is scanned along several directions (lines of sight). The directions may comprise four orthogonal directions that may be aligned with the four cardinal compass directions. Line-of-sight wind speed measurements are generated at the four orthogonal directions. The method includes determining a derivative with respect to distance of the line-of-sight wind speed measurements at each of the four orthogonal directions. The derivatives are compared to a threshold value to determine if a potential wind event has occurred. If the magnitude of the derivatives of two adjacent directions of the four orthogonal directions both exceed the threshold value, a predicted angular position of the potential wind event is determined relative to the Doppler lidar unit. The Doppler lidar unit may then operate in a fine scan mode in which only a limited sector about the predicted angular position of the potential wind event is scanned. The limited sector is preferably less than about 90°, and may be 30° or smaller. The potential wind event is then quantified utilizing data obtained using the fine scan mode. When the coarse mode is employed, beam scanning in a coarse angular coverage of only a few angles of a circular area is preferably used. This coarse mode is used for rapid coverage of all possible directions from which a wind event may come. When the fine mode is employed, beam scanning of fine angular coverage concentrating on only a limited sector of a circle is preferably used. This fine mode is used for quantifying an oncoming wind event.

A wind event warning system according to the present invention may utilize high-energy Doppler lidar for measurements of winds. Wind may be measured by the Doppler shift from naturally occurring aerosol (dust) particles entrained in the wind. High-energy lidar may be distinguished from the more common and commercially available low-energy Doppler lidar. Low-energy lidar typically does not have enough laser pulse energy to reach the long distances needed to provide adequate warning time. The National Aeronautics and Space Administration (NASA) has developed the highest energy Doppler lidar known to be in existence. This lidar may be configured to provide a wind event warning system according to the present invention. The lidar may be located near equipment or other installation to be protected. The lidar beam is pointed horizontally and scanned to varying azimuth angles. The output from the lidar is preferably at a wavelength that makes the laser beam safe for viewing by the human eye.

To identify an oncoming wind hazard/event, the lidar beam is scanned in two modes, namely, a coarse mode to first identify a hazard/event, then a fine mode to quantify the hazard/event. Other than angles scanned and viewed, the laser/lidar parameters may be the same for the coarse and fine modes.

In the coarse mode, the lidar beam is scanned along several different directions, preferably four orthogonal compass directions. If four directions are utilized, the four directions do not need to be exactly aligned with the cardinal compass directions, and may be distributed around a circular perspective around the area to be protected. In the coarse mode, the lidar beam may be set to four fixed directions, and there may not be any scanning about the four fixed directions. The scan in each direction may be taken in a relatively short period of time (e.g. about 2 seconds or less), such that all four discreet directions can be scanned quickly (e.g. about 8-10 seconds or less). In this way, a severe wind event from any arbitrary direction can be detected. Detection of a potential severe wind event in the coarse mode is made by taking a derivative with respect to distance of the line-of-site wind speed measured at each of the four azimuth positions. A change in the wind vector will show up as a spike (marked increase) in the magnitude of the derivative. A threshold value for the derivative may be set so that ordinary, harmless wind turbulence will not set off a false alarm for a possible event/hazard.

If a spike in the derivative of the wind speed along one direction is found/detected, further information can then be determined from the adjacent scan angles. The relative strength of the derivative signals of two adjacent scan angles may be utilized to determine a predicted direction at which the severe wind event is located. Alternatively, the direction may be determined utilizing an inverse tangent function of the ratio of the distance to the wind event along two orthogonal coordinate axes.

Once the direction of the event or hazard is determined, the fine scan mode may be initiated. The fine scan mode is utilized to quantify the strength of the oncoming severe wind event, and the direction from which the event is approaching. Using information from the coarse mode of operation, the sector of compass directions to be scanned in the fine scan mode are determined. The sector of compass directions scanned during the fine scan mode may comprise a sector that is less than 90° (e.g. 30°), that is preferably centered along the direction from which the severe wind event is approaching.

Once the parameters of the severe wind event (wind speed, wind direction, distance from the lidar unit, and direction from the lidar unit) are determined, a recommended protective action for a wind turbine or other unit or facility may be determined/set. The recommended action could be, for example, to rotate a turbine nacelle to face a particular wind direction and/or to feather the turbine blades to disable rotary motion of the blades.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 2 is a schematic plan view of a lidar unit showing four compass directions; and FIG. 3 is a schematic plan view showing a sector that is scanned in the fine-mode scanning.

DETAILED DESCRIPTION OF THE INVENTION

Figure 1:
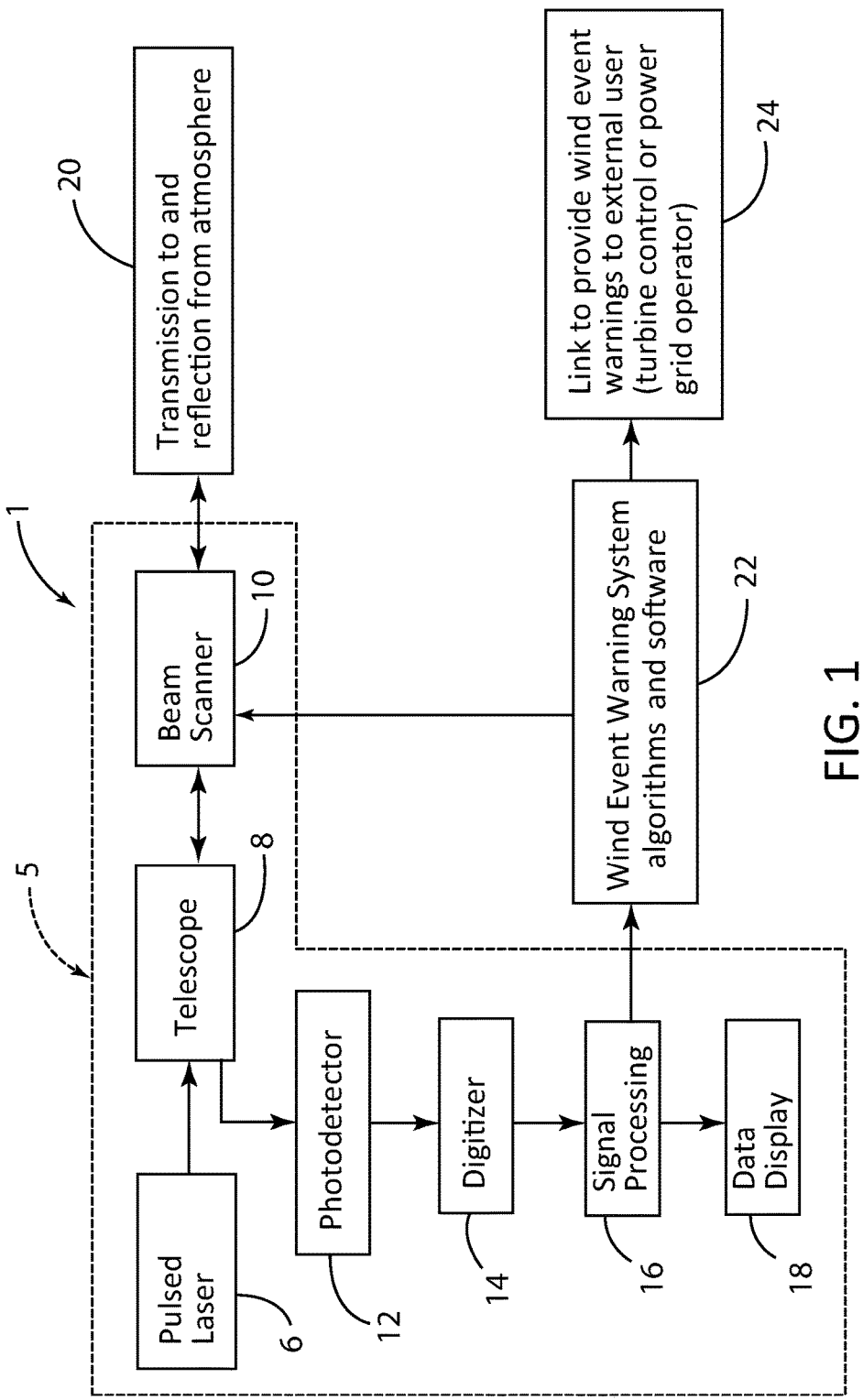
FIG. 1 is a block diagram of a lidar system/method according to one aspect of the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a wind event warning system 1 according to one aspect of the present invention may include a Doppler lidar system 5. The Doppler lidar system 5 may include a pulsed laser 6, telescope 8, and beam scanner 10 that generate a laser/lidar beam that is transmitted to the atmosphere and reflected from the atmosphere in a known manner as indicated at 20. A photo detector 12, digitizer 14, signal processing electronics and software 16, and data display 18 detect and process reflected light from telescope 8. The lidar system 5 may comprise a known Doppler wind lidar system such as the NASA Doppler Aerosol WiNd (Dawn) lidar system. However, other types of known Doppler lidar systems could also be utilized according to other aspects of the present invention. In general, the hardware of lidar system 5 may be substantially the same as know lidar systems. However, as discussed in more detail below, lidar system 5 may be operated and utilized in a unique way according to the present invention.

Referring again to FIG. 1, the wind event warning system 1 includes algorithms and software 22 that are operably interconnected with the beam scanner 10 and signal processing element 16 to provide a wind event warning via a link 24 or other suitable means.

With further reference to FIG. 2, the lidar system 5 may be positioned at a lidar location 30. As discussed in more detail below, during the coarse scanning mode the lidar beam may be sequentially aligned along the orthogonal compass directions north, east, south, west. The lidar beams or "look directions" are represented by the dashed arrows 32-38. It will be understood that the lidar beam directions 32-38 do not necessarily need to be aligned with the compass directions north, east, south, west, respectively. For example, the beam directions 32-38 could be rotated relative to the cardinal compass directions. Also, the wind event warning system 1 would not necessarily need to utilize four orthogonal beam directions 32-38 as shown in FIG. 2. For example, fewer beam directions or more beam directions could be utilized. Also, although the beam directions are preferably disposed at equal angular positions relative to one another, the beam directions could be oriented relative to one another at non-equal angular positions.

As discussed in more detail below, the coarse scan mode (FIG. 2) is utilized to determine an angular position of a wind event. The wind event warning system 1 then shifts to a fine scan mode (FIG. 3) about a direction 40 from which the wind event is approaching. The fine scan mode may be carried out over a sector 42 that is centered on the direction of the wind event 40. Dashed lines 44 and 46 represent the limits of the angles scanned by the lidar beam. The sector 42 is preferably less than 90°. Sector 42 may comprise a 30° segment defining angles θ1 and θ2 of 15° as shown by the dashed lines 44 and 46.

Wind-measuring lidars typically utilize a laser that produces a lidar/laser beam that points to one orientation at a time, called a line-of-sight or look direction. The lidar beam may be scanned among several discreet lines of sight with a rotating mirror device. At each line of sight, data is created/generated, including: 1) signal level versus distance from the lidar beam source (range); and 2) wind speed along the line of sight versus distance from the lidar beam source.

The methods/algorithms by which these data products are created depends on the type of wind lidar being used. For example, steps involved in using a 2-μm wavelength coherent Doppler lidar is described in G. J. Koch, J. Y. Beyon, B. W. Barnes, M. Petros, J. Yu, F. Amzajerdian, M. J. Kavaya, and U. N. Singh, "High-Energy 2-μm Doppler Lidar for Wind Measurements," Optical Engineering 46(11), 116201-1 to 116201-14 (2007). Steps involving a 355-nm wavelength molecular Doppler lidar are described in B. M. Gentry, H. Chen, and S. X. Li, "Wind measurements with 355-nm molecular Doppler lidar," Optics Letters 25, 1231-1233 (2000). Regardless of the type of wind lidar, the two data products described above are ultimately the same and can be used in a wind event warning system 1 according to the present invention. Also common to the different types of known lidar is a beam scanning device to steer the lidar beam among various lines of sight. As discussed in more detail below, the wind event warning system 1 of the present invention may utilize a beam scanner to provide dynamic control of a lidar scan pattern.

The present invention may include the following steps:

1) ACQUISITION: To start the coarse mode of scanning (FIG. 2) to detect a possible severe wind event, the lidar beam is scanned among several pointing/look directions 32-38 that sweep through a circle. Four such angles/look directions are preferably used, with settings of north, east, south, and west. However, if an obstruction (e.g. a building or trees) is present at the lidar location that prevents exact pointing in the four cardinal compass directions, the four directions may be rotated relative to the four cardinal compass directions. Preferably, coverage in approximately four compass directions is made. From each of these four beam orientations (look directions), data is produced of the two primary data products of signal level versus range and wind speed along the line of sight versus range. For each sweep of observations at views through a circle, an array of data is created in columns of distance from the lidar beam source, signal level, and wind speed. It will be understood that the present invention is not limited to four orthogonal beam orientations. More or fewer beam directions may be utilized, and the beam directions do not necessarily need to be equally spaced (e.g. orthogonal) relative to one another.

2) SIGNAL LEVEL EDITING/FILTERING: This step (e.g. 22; FIG. 1) ensures that erroneous measurements are not used in subsequent calculations to prevent/reduce false warnings. The signal level versus distance is compared against a threshold level, so that data points of a level lower than the threshold are discarded from further use. The threshold level may be set by a calibration process in which the lidar beam is blocked and the signal level recorded, representing the noise floor of the received signal. The threshold is a user-set factor above this noise floor, at, for example, 1.1 times the level of the noise floor. If the signal level is below the threshold from more than 2 consecutive distance points, then all of the data in the array beginning with the first of the two consecutive distance points may be discarded and not used in subsequent calculations. If a signal level is below threshold for only one distance point, the speed at this distance may be deleted and replaced with the average speed of the two adjacent distance points. Thus, the array of data from the Step 1 may be edited/filtered in step 2 to include only data having sufficient quality to detect/locate wind events.

3) SPEED CONTINUITY: This step determines if a wind event is possibly occurring along a particular line of sight or look direction 32-38 (FIG. 2). For each of the lines of sight used in Step 1, the mathematical derivative of the speed with respect to range is calculated. If the mathematical derivative exceeds a user-set value called "sensitivity" then a data "flag" is raised/set, along with an indication of the range at which this event occurred and the number value (magnitude) of the derivative of speed with respect to distance. The calculation is repeated for all of the look angles acquired.

4) DETERMINING NEED FOR AND CENTRATION OF FINE MODE SCAN.

This step determines if there is a need to engage a fine mode scan and in which direction to center the fine mode scan. From Step 3, if no flag were raised during a coarse mode scan of the four directions, then another coarse mode scan at each of the four directions is repeated. If however, a flag were raised from the results of Step 3, a fine mode scan (FIG. 3) is initiated. The fine mode scan may be utilized to verify the occurrence of a wind event and to quantify the wind event. The information from Step 3 indicates in which direction (angular position) to center the fine mode scan, by considering which lines of sight showed a flag and the value of the derivative of speed with respect to range at the flagged location. If an oncoming wind event is coming directly from one of the four look directions 32-38 used in the coarse-scan mode, then this direction would show a flag and a strong derivative of speed value. In this scenario, only this one scan direction would show a flag and a fine mode scan may be centered in this direction. Alternatively, a wind event may come from an arbitrary direction, and hence multiple look angles are used in the coarse scan mode. By considering all of the look angles, a wind event from any direction can be detected by noting the directions at which a flag was raised. If a flag was raised only in one direction, then this is the direction in which to center the fine mode. If, however, a flag is raised in two directions an if-then algorithm is executed of the form:

flag raised in north and east directions:
 fine mode center angle $\alpha=90-\tan^{-1}(x/y)$
flag raised in east and south directions
 fine mode center angle $\alpha=90+\tan^{-1}(x/y)$
flag raised in south and west directions
 fine mode center angle $\alpha=270-\tan^{-1}(x/y)$
flag raised in west and north directions
 fine mode center angle $\alpha=270+\tan^{-1}(x/y)$ where x is the distance to the flag location in the east/west orientation, and y is the distance to the flag location in the north/south orientation. These distances to flag locations are determined in Step 3 as described above. In these calculations, looking toward the north is 0-degrees, east is 90-degrees, south is 180-degrees, and west is 270-degrees. The fine mode center angle $\alpha$ calculated in this step is the heading toward which the fine mode scan is centered. This heading corresponds to a predicted direction (angular position $\alpha$) of the potential wind event relative to the source of the lidar beam as shown by line 40 (FIG. 3). In the unlikely event that a flag is raised in more than two directions, only the two directions with the highest values for the derivative of speed with respect to distance are used. It will be understood that the predicted direction could, alternatively, be determined by comparing the relative strength of the derivative signals of two adjacent scan angles or other suitable technique.

5) FINE MODE SCAN. Presuming the need for a fine mode scan was identified in Step 3, and using the direction (angle $\alpha$) in which to center the fine mode scan identified in Step 4, a fine mode scan is carried out along a sector 42 (FIG. 3). The goal of the fine mode scan is to quantify the wind event in terms of the wind speed of the event, wind direction of the event, the distance to the event, and the expected time of arrival of the event. The fine mode scan can be implemented in various ways depending on the type and specifications of the lidar. For example, the fine mode scan could be implemented by sampling at a few look angles, or by sampling through a continuous sweep of a sector.

Two examples of five mode scanning are "Doppler beam swinging" in which three lines of sight are used spanning through a sector 42 of, for example, 30-degrees. A second approach is called "plan position indicator". In this approach a sector 42 is scanned continuously. It will be understood that the present invention is not necessarily limited to these two approaches or variations thereof.

Sampling at a few look angles is typically used with lidar of a lower pulse repletion rate (e.g. less than 100-Hz). This approach is a variant of the "Doppler beam swinging" technique. Examples of this calculation are described in G. J. Koch, J. Y. Beyon, E. A. Modlin, P. J. Petzar, S. Woll, M. Petros, J. Yu, and M. J. Kavaya, "Side-Scan Doppler Lidar for Offshore Wind Energy Applications," Journal of Applied Remote Sensing 6, 063552 (2012). Using this approach, the lidar beam may be scanned at three angles as shown in FIG. 3: one at 15-degrees counterclockwise from the center angle a determined in Step 4 (line 44), one at the center angle a determined in Step 4 (line 40), and one at 15-degrees clockwise from the center angle a determined in Step 4 (line 46). It will be understood that the present invention is not limited to 15 degree angles, and this is merely an example of suitable angles.

Sampling through a continuous sweep of a sector 42 is typically used with lidar of a higher pulse repetition rate (e.g. greater than 100-Hz). This approach is a variant of the "plan position indicator (PPI)" technique. An example of this type of lidar beam scan is disclosed in C. J. Grund, R M. Banta, J. L. George, J. N. Howell, M. J. Post, R. A. Richter, and A. M. Weickmann, "High-Resolution Doppler Lidar for Boundary Layer and Cloud Research," J. Atmos. Oceanic Technol., 18, 376-393 (2001). Using this approach, the lidar beam may be scanned through a 30-degree sector centered on the line 40 at an angle a determined in Step 4.

Regardless of the type of five scan used, the results of this step is data including the wind vector (speed and direction) as a function of distance. This distance is in the direction of the angle a determined in Step 4. A quality control of this data on the wind vector is performed by a technique such as SIGNAL LEVEL FILTERING of Step 2, in which the wind vector is not reported for distances that fall below a threshold set for the signal level.

6) LOCATING DISTANCE TO THE WIND EVENT. This step determines how far away the wind event is from the lidar location 30. The wind speed data from Step 5 is processed with a mathematical derivative of wind speed with respect to distance. Values (magnitudes) of this derivative above a user-set threshold ("event threshold") indicate the corresponding distance of the wind event. At distances less than the distance to the event threshold, the wind vector will be different than the vector at distances greater than the distance to the event threshold. In other words, a wind event is occurring at the distance at which the magnitude of the derivative of the wind speed with respect to distance exceeds the event threshold.

7) DETERMINING TIME OF ARRIVAL OF THE WIND EVENT. The wind speed at one or more distances that are greater than the range to the event threshold is calculated. The time of arrival of the wind event is then found by dividing the distance to the event threshold (from Step 6) by the wind speed determined at one or more distances that are greater than the distance to the event threshold.

8) SUMMARIZING AND DISSEMINATING WIND EVENT WARNING. A text file may be generated that includes data of an alert indicating:
 a. distance to wind event (from Step 6)
 b. compass bearing from which wind event is coming (from Step 4)
 c. time until arrival of wind event (from Step 7)
 d. wind speed and wind direction once wind event arrives (from Steps 5 and 6)
This data is transferred to the end user by computer network such as Ethernet, WiFi, or serial connection. The end user could be another computer that directs re-orientation of wind turbines or alerts a human operator.

9) REPEAT ALGORITHM. The algorithm is repeated from Step 1. Multiple warnings would be generated with each iteration, tracking progress of the wind event. Such multiple measurements are beneficial because wind events can change.

The coarse-mode/fine-mode configuration described above may be used to provide rapid warning of wind events to give as much lead time as possible of an oncoming wind event. However, the present invention is not necessarily limited to coarse and fine mode operation. For example, lasers producing higher energy pulses at higher pulse repetition rates may be implemented without converting from a coarse-mode scan to a fine-mode scan. A fine-mode scan may be used that simply sweeps out a complete circle. Data from the full circle may be divided into sectors, such as 12-sectors each spanning 30-degrees. A wind vector calculation may be made on each of these 12-sectors, and a Wind Event Warning System/method may start from Step 5 above.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of detecting a wind event utilizing Doppler lidar, the method comprising:
 causing a Doppler lidar unit to operate in a coarse scan mode in which a lidar beam is scanned along four orthogonal directions;
 generating line-of-sight wind speed measurements at the four orthogonal directions;
 determining a derivative with respect to distance of the line-of-sight wind speed measurements at each of the four orthogonal directions;
 comparing the derivatives to a threshold value to determine if a wind event has occurred;
 if the magnitude of the derivatives of two adjacent directions of the four orthogonal directions both exceed the threshold value, determining an angular position of the wind event relative to the Doppler lidar unit;
 causing the Doppler lidar unit to operate in a fine scan mode in which only a limited sector about the angular position of the wind event is scanned, wherein the limited sector is less than about ninety degrees;
 quantifying the wind event utilizing data obtained using the fine scan mode.

2. The method of claim 1, including:
 determining distances to the wind event at the two adjacent directions.

3. The method of claim 2, including:
 utilizing an inverse tangent of the distances at the two adjacent directions to determine the angular position.

4. The method of claim 2, wherein:
 the distance to the wind event is determined utilizing a magnitude of a derivative of wind speed with respect to distance.

5. The method of claim 1, wherein:
 data obtained using the fine scan mode is utilized to quantify at least one of the wind speed of the wind event, the wind direction of the wind event, the distance to the wind event, and the expected time of and/or to arrival of the wind event at a specified location.

6. The method of claim 5, wherein:
 the distance to the wind event is determined utilizing a derivative of speed with respect to distance.

7. The method of claim 6, including:
 determining at least one wind speed at a distance that is greater than the distance to the wind event;
 determining the expected time of, and/or to, arrival of the wind event by dividing the distance to the wind event by the at least one wind speed at a distance that is greater than the distance to the wind event.

8. The method of claim 7, including:
 generating a data set comprising at least one of 1) the distance to the wind event; 2) the angular direction of the wind event; 3) the expected time of arrival of the wind event; 4) the speed of the wind of the wind event; and 5) the direction of the wind of the wind event.

9. The method of claim 1, wherein:
the limited sector is about thirty degrees.

10. The method of claim 1, including:
generating a warning signal if data obtained using the fine scan mode satisfies predefined criteria.

11. The method of claim 10, wherein:
a warning signal is generated if the speed of the wind of the wind even exceeds a predefined velocity.

12. A method of detecting a wind event utilizing Doppler lidar, the method comprising:
causing a Doppler lidar unit to operate in a coarse scan mode in which a lidar beam is scanned along three or more different directions;
generating line-of-sight wind speed measurements at the three or more different directions;
determining a derivative with respect to distance of the line-of-sight wind speed measurements at each of the three or more different directions;
comparing the derivatives to a threshold value to determine if a wind event has occurred;
if the magnitude of the derivatives of two adjacent directions of the three or more different directions both exceed the threshold value, determining an angular position of the wind event relative to the Doppler lidar unit;
causing the Doppler lidar unit to operate in a fine scan mode in which only a limited sector about the angular position of the wind event is scanned;
quantifying the wind event utilizing data obtained using the fine scan mode.

13. The method of claim 12, including:
determining distances to the wind event along the two adjacent directions.

14. The method of claim 13, including:
utilizing an inverse tangent of the distances to determine the angular position.

15. The method of claim 13, wherein:
the distance to the wind event is determined utilizing a magnitude of a derivative of wind speed with respect to distance.

16. The method of claim 12, wherein:
data obtained using the fine scan mode is utilized to quantify at least one of the wind speed of the wind event, the wind direction of the wind event, the distance to the wind event, and the expected time of arrival of the wind event at a specified location.

17. The method of claim 16, wherein:
the distance to the potential wind event is determined utilizing a derivative of speed with respect to distance.

18. The method of claim 17, including:
determining at least one wind speed at a distance that is greater than the distance to the wind event;
determining the expected time of arrival of the wind event by dividing the distance to the wind event by the at least one wind speed at a distance that is greater than the distance to the wind event.

19. The method of claim 18, including:
generating a data set comprising at least one of 1) the distance to the wind event; 2) the angular direction of the wind event; 3) the expected time of arrival of the wind event; 4) the speed of the wind of the wind event; and 5) the direction of the wind of the wind event.

* * * * *